United States Patent [19]
Andrews

[11] 3,726,433
[45] Apr. 10, 1973

[54] SEAL RELEASE FOR A PRESSURE VESSEL

[75] Inventor: Edward George David Andrews, Cawston, England

[73] Assignee: Rolls Royce Limited, Derby, England

[22] Filed: Oct. 19, 1970

[21] Appl. No.: 81,735

[30] Foreign Application Priority Data

Oct. 25, 1969  Great Britain.....................52,366/69

[52] U.S. Cl. ........................220/46, 277/22, 277/26, 285/41, 285/187
[51] Int. Cl. ............................................B65d 53/00
[58] Field of Search..................................277/22, 26; 220/46 MS, 45, 46; 285/41, 187

[56] References Cited

UNITED STATES PATENTS

| | | |
|---|---|---|
| 2,992,838 | 7/1961 | Wallace....................................277/22 |
| 3,127,182 | 3/1964 | Wardleigh..............................277/26 |

FOREIGN PATENTS OR APPLICATIONS

| | | |
|---|---|---|
| 695,408 | 8/1953 | Great Britain..........................277/26 |
| 520,129 | 2/1921 | France ...................................277/26 |

Primary Examiner—Houston S. Bell, Jr.
Attorney—Cushman, Darby & Cushman

[57] ABSTRACT

A seal has two portions, the first one of which is adapted to be sealingly secured to a cylindrical wall defining an aperture and the second one of which is adapted to sealingly engage the periphery of an object and is provided with means for varying its temperature so as to disengage the second portion from the periphery of the object.

5 Claims, 1 Drawing Figure

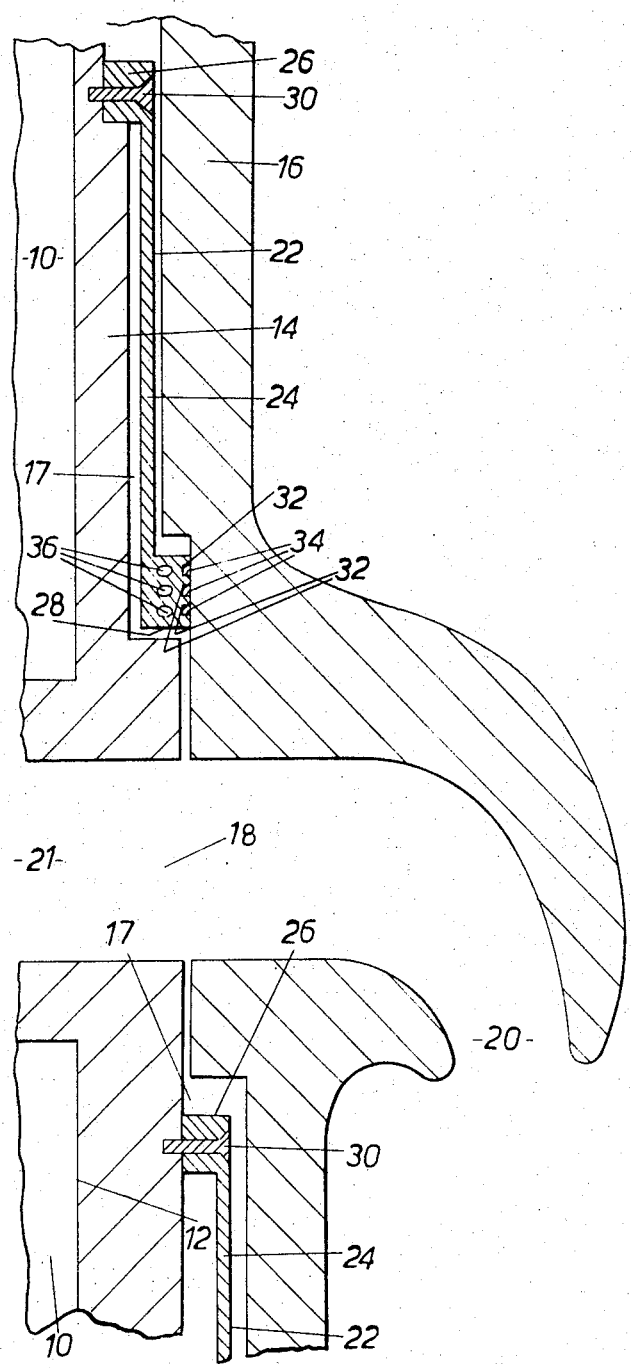

SEAL RELEASE FOR A PRESSURE VESSEL

This invention relates to sealing members, and is particularly but not exclusively concerned with a sealing member suitable for use in a gas turbine engine power plant similar to those described in U.S. Pat. No. 3,623,325 issued Nov. 30, 1971 to Jubb et al. and assigned to the Common Assignee Rolls Royce Limited.

In U.S. Pat. No. 3,623,325 there is described a gas turbine engine power plant having a nuclear reactor as a heat source and having its turbo machinery and heat exchangers mounted in a cylindrical pod which is mounted in a recess in the pressure vessel of the nuclear reactor and which is removable therefrom along the axis of the pod independently of the nuclear reactor. The pod has at least two inaccessibly positioned radially extending ducts which are sealingly connected to further ducts communicating with the nuclear reactor and which must be disconnected to permit removal of the pod. It is an object of the present invention, therefore, to provide a remotely disconnectable sealing member.

According to the present invention, a sealing member for effecting a sealed interconnection between two closed surfaces has a first portion adapted to be sealingly secured around or integral with the periphery of one of the surfaces and a second portion which is adapted sealingly engage the periphery of the other surface and which is provided with means for varying its temperature so as to disengage it from the periphery of said other surface.

Preferably, the second portion is an interference fit around the periphery of the other surface.

The first and second portions may be annular in shape and may be substantially coaxial with each other.

In a preferred embodiment of the invention, the first and second portions are interconnected by a substantially cylindrical flexible portion which is preferably arranged so that, in use, the side thereof which is subjected to the lower fluid pressure is closely adjacent to supporting means.

The means for varying the temperature of the second portion preferably comprises heating means, for example at least one electrical heating coil coaxial with, and preferably embedded within, the second portion.

The second portion may include at least one piston ring seal which is adapted to engage the periphery of said other surface.

The invention will now be particularly described, by way of non-limitative example only, with reference to the accompanying drawing, which is a sectional view of a sealing member in accordance with the present invention.

In the drawing there is shown part of a prestressed concrete pressure vessel 10 for a nuclear reactor. The pressure vessel 10 is provided with a cylindrical cavity 12 having a steel liner 14, and contains a cylindrical steel pod 16 coaxial therewith. The pod 16 fits within the liner 14 with a small clearance 17, and is removable therefrom along the axis of the pod 16. Mounted within the pod 16 are the turbo machinery (not shown) and/or the heat exchangers (not shown) of a closed-cycle gas turbine engine power plant of which the nuclear reactor forms the heat source. Such power plants are described in the aforementioned U.S. Pat. No. 3,623,325.

The periphery of the pod 16 is provided with several radially facing openings, one of which is shown at 18, the openings communicating with part of the turbo machinery or one of the heat exchangers within the pod 16 and with the nuclear reactor or another pod elsewhere in the pressure vessel 10. The opening 18 shown in fact communicates with an annular duct 20 within the pod 16 and a duct 21 extending radially of the pod 16 through the concrete of the pressure vessel 10.

In order to prevent leakage of the gas flowing through the opening 18, two axially spaced apart substantially identical sealing members 22, which coaxially surround the pod 16, are provided in the clearance 17, one on each side of the opening 18.

Each of the sealing members 22 comprises a relatively thin, flexible, cylindrical body portion 24 coaxial with the pod 16 and having at one end a more rigid radially outwardly projecting flange 26 and at the other end a more rigid, radially inwardly projecting flange 28. The radially outer peripheral surface of the flange 26 is urged into sealing engagement with the internal peripheral surface of the liner 14 by bolts 30 : however, if desired the flange 26 may be welded to or integral with the liner 14. The radially inner peripheral surface of the flange 28 is arranged to be a close sealing fit, preferably an interference fit, around the external peripheral surface of the pod 16 at all normal operating temperatures of the power plant to which the sealing members 22 are exposed, and is provided with a number, e.g. three, axially spaced apart grooves 32 containing piston ring seals 34. The seals 34 could be replaced by labyrinth-type seals and could be provided in the external surface of the pod 16 instead of in the flange 28.

The two sealing members 22 thus define between them a sealed annular space in the clearance 17, which annular space contains the opening 18.

In use, the radially outer surface of body portion 24 is exposed to a higher pressure than the radially inner surface : it therefore flexes radially inwards until it is supported by the radially outer surface of pod 16. In other applications, the sealing member 22 would be arranged so that the side of body portion 24 subjected to the lower pressure is closely adjacent to a supporting surface.

The flange 28 has embedded in it three electrical heating coils 36 which are coaxial therewith : however, if desired the heating coils 36 may be secured to a suitable external surface of the flange 28, or replaced by passages to which a hot fluid may be supplied. When it is desired to remove the pod 16 axially from the recess 12, the heating coils 36 are energized, thus heating the flange 28 and causing it to expand until it no longer engages the external peripheral surface of the pod 16. The pod 16 may then be withdrawn.

The sealing members 22 thus provide a good seal around the opening 18 when the coils 36 are not energized, but, by the energizing of the coils 36, may be remotely disengaged from the pod 16 to permit the removal thereof.

It will be appreciated that many modifications may be made to the sealing members 22. Thus the flanges 26 and 28 could both project outwardly or inwardly, or the flange 28 could be sealingly secured to the pod 16 by bolts or welding, or be integral therewith, and the flange 26 could be a close or interference fit within the liner 14 and provided with passages to which a coolant such as liquid nitrogen could be supplied to cause disengagement by contraction. Additionally, the close or interference fit could be maintained in use by continuous cooling or heating, and then broken by removing the supply of coolant or heat. Further, the space sealed, i.e. the clearance 17, need not be annular in shape : for example, the liner 14 and the pod 16 could be replaced by oval-shaped members which could be eccentrically arranged.

I claim:

1. A pressure vessel having a wall defining an integral cavity, a pod removably located within the cavity, said pod having at least one duct in communication with the pressure vessel, said duct being sealed by at least two sealing members, each of which comprises a first and a second end portion secured together by a deflectable connecting portion, both of said first end portions being adapted for sealing engagement with said wall of said pressure vessel, and both of said second end portions being adapted for sealing engagement with the outer surface of the pod and means for varying the temperature if one set of said end portions to release those portions from sealing engagement whereby said pod may be removed from said vessel.

2. A pressure vessel as claimed in claim 1 in which the means for varying the temperature comprises at least one electrical heating coil embedded in said second end portions for causing said second end portions to expand away from sealing engagement with said pod.

3. A pressure vessel as claimed in claim 1 in which the means for varying the temperature comprises a flow of coolant adapted to flow through ducts provided in said first end portions for causing said first end portions to contract away from engagement with said pressure vessel.

4. A pressure vessel as claimed in claim 3 in which the coolant comprises liquid nitrogen.

5. A pressure vessel as claimed in claim 1 wherein the cavity of said pressure vessel and said pod each has a cylindrical shape, said pod being coaxially received within said pressure and said duct is formed radially with respect to said pod.

* * * * *